Aug. 16, 1966   W. BERTHELSEN   3,267,287
ELECTRIC EYE LEVEL CONTROL
Filed May 3, 1963   6 Sheets-Sheet 1

INVENTOR.
Walter Berthelsen
BY Robert C. Churchill
ATTORNEY

Fig. 2

INVENTOR.
Walter Berthelsen
BY Robert R. Churchill
ATTORNEY

United States Patent Office 3,267,287
Patented August 16, 1966

3,267,287
ELECTRIC EYE LEVEL CONTROL
Walter Berthelsen, Quincy, Mass., assignor to Pneumatic Scale Corporation, Limited, Quincy, Mass., a corporation of Massachusetts
Filed May 3, 1963, Ser. No. 277,755
12 Claims. (Cl. 250—222)

This invention relates to an electric eye level control for detecting the level of the material in containers.

The invention has for an object to provide a novel and improved electric eye level control unit for checking the level of material in successive continuously moving containers and which is particularly adapted for detecting those levels below a predetermined minimum level of material in the container.

The invention has for a further object to provide a novel and improved electric eye level control unit of the character specified wherein provision is made for quickly and easily adjusting the control unit to vary the predetermined minimum level of the material being checked.

With these general objects in view and such others as may hereinafter appear, the invention consists in the electric eye level control unit hereinafter described and particularly defined in the claims at the end of this specification.

In the drawings illustrating the preferred embodiment of the invention:

FIG. 4 is a wiring diagram to be referred to;

In general the present invention relates to a novel electric eye level control unit for detecting the level of the material in successive continuously moving containers. The present invention is primarily concerned with insuring a predetermined minimum level of the material below the upper end or top of successive containers and for detecting any level below such predetermined minimum level in the container. In the preferred embodiment of the invention means responsive to the detection of such defectively filled container is provided for actuating a signal so that the operator may remove the defectively filled container, or for actuating rejecting mechanism for automatically rejecting such defectively filled container.

Applicant is aware that prior to the present invention electric eye control units have been used for producing a signal or effecting rejection of a container when the level of the material was found to deviate from a predetermined level. However, such prior devices depended on the reflection on the surface of the material passing out of the range of vision or scanning range of the photoelectric eye. In accordance with the present invention applicant has provided a novel manner of detecting underfilled containers wherein one side wall of the container serves to shield a portion of the scanning range of the photoelectric eye in a manner such that any deviation below a predetermined level will be detected to produce a signal indicating an underfilled container, or will activate mechanism for rejecting the underfilled container, or both.

An important feature of the present invention resides in the disposition of the electric eye level control unit relative to the moving containers. Prior to the present invention it has been the practice to arrange the light source and the electric eye in spaced angular relation above and in a plane in longitudinal alignment with the direction of movement of the containers to be checked. Such containers, usually in the form of cartons, are provided with upstanding end closure flaps, and such upstanding leading flap was disposed so as to cut off the light source or angular beam of light from the level of the material below the score line of the flaps during the initial portion of the movement of the container into operative relation to the control unit. Likewise, the upstanding trailing flap was disposed so as to prematurely cut off the vision or scanning range of the electric eye with respect to the surface of the material. Thus, the actual scanning time during which the light beam falls on the surface of the material and during which the eye is in scanning relation to such surface was limited by said extended flaps. Since it takes about .05 seconds for the electric eye to respond to the image reflected from the surface of the material, such prior arrangement of the control unit is incapable of being used when a relatively small carton traveling at a relatively fast speed is being run.

In accordance with the present invention the light source and the electric eye are angularly arranged in spaced relation above and in a plane transversely of the direction of movement of the containers, and provision is made for folding the side flaps of the carton outwardly at right angles to the carton. This expedient exposes substantially the entire upper surface of the material to the detecting elements, and since the rectangular cross section container is usually run with the major axis of the top of the carton parallel to the direction of movement of the carton, ample time is provided for the image reflected from the surface of the material to excite the detecting element and cause the latter to respond to the image detected even when a relatively small carton traveling at a relatively fast speed is run.

A further advantage of arranging the detecting elements transversely of the direction of movement of the carton with the side flaps folded down out of the way is that the beam of light may be angularly directed toward a side wall of the carton, and the entire control unit may be adjusted laterally with respect to said side wall in a manner such that when the level of the material is at a predetermined desired level the vision of the electric eye will not be cut off by the side wall, but if the level is below such predetermined level, a portion of the reflected image will be cut off from the electric eye by the side wall of the carton, thus reducing the visible portion of the image to an extent such as to cause the control unit to be actuated to reject the defectively filled carton. In practice it has been found that the expedient of using the side wall of the carton to cut off the vision of the electric eye in the manner defined enables a relatively small deviation of the level of the material below a predetermined level to effect a relatively large cutoff of the vision or scanning range of the electric eye so that extremely accurate minimum levels may be maintained in the container.

Another important advantage of arranging the detecting elements in the manner above defined resides in the fact that the entire detecting unit may be bodily adjusted transversely of the direction of movement of the containers to a different position relative to the said side wall of the carton when a different minimum level of the material is desired to be maintained. Thus, in practice when different minimum levels in the same or in different cartons being run are desired, it is merely necessary to adjust the control unit laterally for the predetermined minimum level required.

It will be understood that in practice the electrical circuit of which the control unit is a part is arranged to permit passage of the container when a reflection from the surface of the material is of maximum intensity and is arranged to effect rejection of the container when the intensity of the reflection is reduced in the manner described.

In practice the filled container being moved into and out of operative relation to the electric eye level control unit is of a size such as to accept the maximum volume of a weighed or measured load without overfilling the same and, hence, as a practical matter, any deviation in the filling height beyond or above a predetermined minimum level will not render the container unacceptable. It will, therefore, be understood that the present invention is directed particularly to detecting underfilled containers or levels below a predetermined minimum level and to means for quickly and easily changing such predetermined minimum level.

In summary, the object of the present invention is to provide a novel electric eye level control unit for detecting the level of the material in successive continuously moving containers open at the top wherein the light source and the electric eye are angularly arranged in spaced relation above the containers in a manner such that the beam of light is angularly directed toward the inner face of a side wall of the carton in a position such that when the level of the material assumes a predetermined minimum level, the vision of the electric eye will not be cut off by the side wall and as a result the reflection on the material will be of maximum size and intensity, but if the level is below such predetermined level, a portion of the reflected image will be cut off from the vision of the electric eye by the side wall of the carton, thus reducing the visible portion of the light reflection in size and intensity to an extent such as to cause the control unit to actuate a signal indicating an underfilled container, or will activate mechanism for rejecting the underfilled container.

Referring now to the drawings, in the illustrated embodiment of the invention the filled containers to be checked are represented by the numeral 10, and the electric eye level control unit is indicated generally at 12, and includes a light source 14 and a photoelectric eye 16. The filled containers 10, herein shown as cartons, may be delivered from a filling or weighing machine and are continuously advanced along a conveyer indicated generally at 18. The conveyer includes an elongated stationary supporting platform 20 along which the cartons are advanced by spaced pusher members 22 carried by a vertically arranged flexible metal belt 24 traveling in a horizontal plane. The belt 24 is arranged to bear against the outer ends of upper and lower brackets 26, 28 extended laterally from a frame member 30, and the inner face of the belt is provided with spaced lugs 32 adapted for engagement with sprockets, not shown, for driving the belt.

One side wall 34 of the carton 10 bears against the outer face of the belt 24 and is retained in snug engagement therewith by guide rails 36 which engage the opposite side wall 38 of the carton as shown. In this manner successive cartons 10 being advanced are maintained in uniform alignment and in a uniform position relative to the electric eye level control unit 12.

As herein shown, the filled cartons are provided with upstanding top closing flaps comprising end flaps 40, 42 and side flaps 44, 46, and provision is made for folding the side flaps 44, 46 outwardly at right angles to the side walls 34, 38, respectively, prior to arrival of successive cartons into operative relation to the level control unit 12. This is accomplished by opposed stationary guide rails 48, 50 supported above the cartons and which are provided with downwardly and outwardly bent portions 52 arranged in the path of the upstanding side flaps to engage and fold the same downwardly and outwardly as the cartons are advanced therepast. The opposed rails 48, 50 are secured to and extended from the side edges of a central plate 54 which is supported by a laterally extended bar 56 adjustably carried by an upright post 58 secured to the machine frame. The forward ends of the folding rails 48, 50 are extended, as shown, to hold the side flaps down during the checking operation, and such forward ends are further supported by angle brackets 60, 62 secured to the bracket 26 and to the guide rails 36, respectively. Thus, when successive cartons 10 arrive at the checking station practically the entire upper surface of the material in the carton is exposed to the vision of the electric eye unit without interference from the upstanding flaps during the checking operation.

The light source 14 and the photoelectric eye 16 of the level control unit 12 may comprise conventional units wherein the light source includes a lamp 64, reflector 65 and lens 66 mounted in a casing 68, and the photoelectric eye includes a photocell 69 having a cathode 70 and lens 72 mounted in a casing 74. As illustrated, the opposed angularly arranged units 14, 16 are disposed on opposite sides of the conveyer 18 in a plane transversely of the direction of movement of the cartons, and in practice the casings 68, 74 are initially angularly arranged and secured in fixed spaced relation to each other on a back plate 75 which in turn is attached to the upstanding leg 76 of an angle bracket. The horizontal leg 78 of the angle bracket is secured to a slide bar 80 mounted for adjustment transversely of the conveyer in a horizontal bracket 82. The bracket 82 is secured to the upper end of a vertically adjustable slide bar 84 mounted in a bracket 86 attached to the frame member 30.

Horizontal adjustment of the electric eye level control unit 12 is effected by a rod 88 threaded at one end and supported at its other end in an upstanding bearing plate 90 attached to one end of the slide bar 80. The threaded end of the rod 88 is received in a threaded opening formed in an upright extension 94 from the horizontal bracket 82. The rod 88 is also provided with a handwheel 96 which bears against one side of the upstanding bearing plate 90 and a collar 98 which bears against the other side of the bearing plate to prevent longitudinal axial movement of the rod relative to the bearing plate and the slide bar. In operation, when the handwheel is rotated in one direction, the entire control unit is bodily moved to the left, and when rotated in the other direction the control unit is moved to the right.

The vertically adjustable slide bar 84 is provided at its lower end with a bracket 100 having a threaded opening for receiving the threaded end of an adjusting rod 102. The other end of the rod 102 is mounted for rotation in a bearing bracket 104 secured to the bracket 86. The rod 102 is provided with a handwheel 106 engaging the upper surface of the bearing bracket 104, and a collar 108 engaging the underside of the bracket to prevent axial movement of the rod. Rotation of the handwheel 106 in one direction effects raising of the entire control unit 12 relative to the top of the carton, and rotation in the other direction effects lowering of the control unit.

Figures 5, 6, 7, 9:
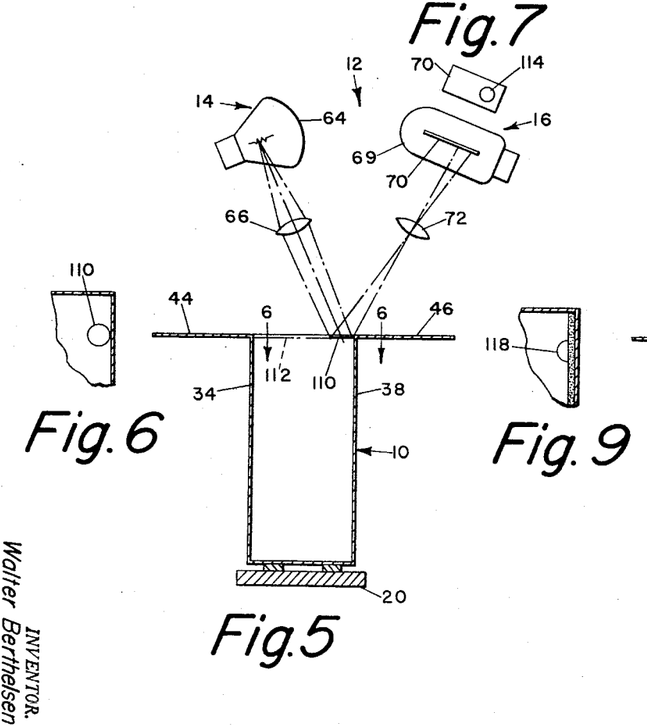
FIG. 5 is a diagrammatic view illustrating the electric eye level control unit adjusted in a position to check a predetermined minimum level of the material near the top of the carton.
FIG. 6 is a partial plan view partly in cross section showing the light reflected from the surface of the material and visible to the electric eye when the material is at or above a predetermined minimum level, the section being taken on the line 6—6 of FIG. 5.
FIG. 7 is a plan view of the cathode showing the image reflected thereon from the surface of the material shown in FIG. 5.
FIG. 9 is a plan view partly in cross section showing a reduced amount of light reflected from a level below said predetermined minimum level, the section being taken on the line 9—9 of FIG. 8.
Figures 8, 10:
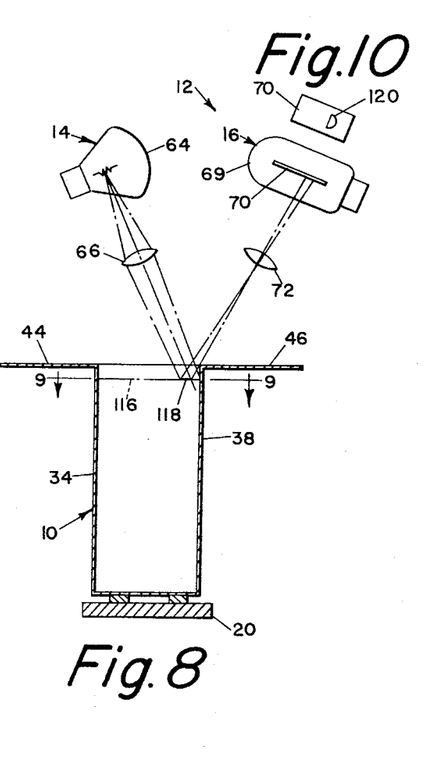
FIG. 8 is a diagrammatic view showing the control unit in the same position as in FIG. 5 but illustrating a level below said predetermined minimum level.
FIG. 10 is a plan view similar to FIG. 7 showing the reduced image reflected on the cathode from the surface of the material shown in FIG. 8.

As diagrammatically illustrated in FIGS. 5 and 8, the electric eye level control unit 12 is shown as adjusted laterally relative to the carton 10 and the side wall 38 thereof in a position such as to check a predetermined minimum level of material at a relatively high point in the carton. The light reflection 110 at the level 112 indicated in FIGS. 5 and 6 is within the scanning range and fully visible to the electric eye so that the image 114 reflected on the cathode 70 is of high intensity as shown in FIG. 7. On the other hand, as illustrated in FIGS. 8 and 9, when the material in the carton is at a lower level, as indicated at 116, the light reflection 118 is partly cut off or shielded from the scanning area of the electric eye by the side wall 38 so that the portion of the reflection visible to the cathode 70, as indicated by the reflected image 120 shown in FIG. 10 is of greatly reduced size and intensity.

It will be seen that the light source 14 is arranged at an angle such as to cast its beam toward the inner face of the side wall 38 of the carton, and the electric eye 16 is arranged relative to the side wall 38 so that a portion of its scanning range will be shielded by the side wall 38 whereby progressively lower levels of the material in successive cartons will cause correspondingly smaller portions of the reflection to be visible to the electric eye by reason of the shielding effect of the side wall 38.

It will be understood that the electric eye may be set or adjusted so as to respond to any slight variation in the intensity of the reflection visible to the electric eye. Thus, in the example illustrated in FIGS. 5 and 8, the predetermined minimum level may be assumed to be anywhere between the illustrated levels indicated at 112, 116, the intensity of the reflection above such assumed predetermined minimum level being sufficient to indicate a properly filled carton, and the reflection below such assumed predetermined minimum level being reduced in intensity to an extent such as to indicate an improperly filled carton, subject to being rejected from the line.

As previously stated, the present invention is particularly concerned with detection and rejection of cartons filled to a level below such predetermined minimum level wherein the visible portion of the light reflection is substantially reduced by the shielding effect of the side wall of the carton when the level of the material is reduced a relatively small amount below the selected level. The invention is further concerned with adjustment of the control unit laterally relative to the side wall of the carton to vary the level at which the carton will be rejected.

Figures 11, 12, 13, 15:
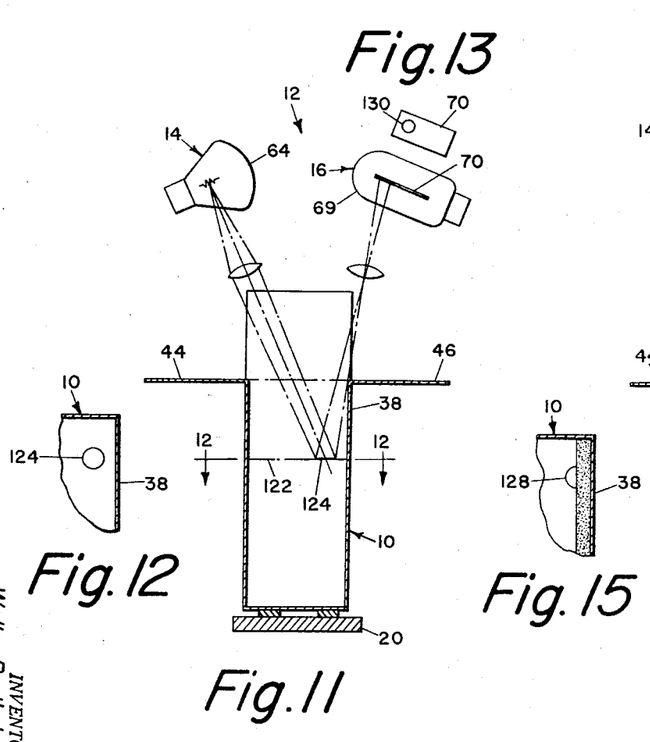
FIG. 11 is a diagrammatic view similar to FIG. 5 showing the electric eye level control unit adjusted to a different position of operation for checking a different predetermined minimum level.
FIG. 12 is a partial plan view partly in cross section showing the light reflected from the surface when the level of the material is at or above a predetermined minimum level, as shown in FIG. 11, the section being taken on the line 12—12 of FIG. 11.
FIG. 13 is a plan view of the cathode showing the image reflected from the surface of the material at the level shown in FIG. 11.
FIG. 15 is a partial plan view partly in cross section showing the light reflected from the surface at the level shown in FIG. 14, the section being taken on the line 15—15 of FIG. 14.
Figures 14, 16:
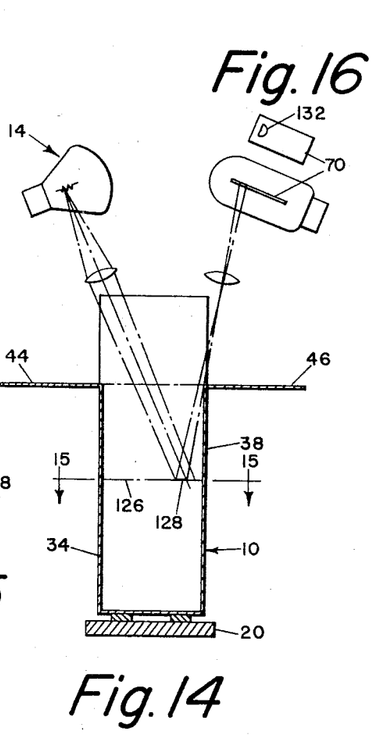
FIG. 14 is a diagrammatic view similar to FIG. 11 but illustrating a level of material below the predetermined minimum level shown in FIG. 11.
FIG. 16 is a plan view of the cathode showing the image reflected from the level shown in FIG. 14.

As illustrated in FIGS. 11 and 14, the electric eye level control unit is therein shown as adjusted laterally relative to the side wall 38 of the carton in a position such as to check a predetermined minimum level of material at a relatively low point in the carton. At the higher level 122 shown in FIGS. 11 and 12, the light reflection 124 is fully visible to the cathode 70 of the electric eye 16, and at the lower level 126 shown in FIGS. 14 and 15, the light reflection 128 visible to the cathode is of greatly reduced area by reason of the shielding effect of the side wall 38. The reflected image 130 shown in FIG. 13 and the reflected image 132 shown in FIG. 16 on the cathode 70 correspond to the light reflections 124, 128, respectively, at the different levels shown. Here also, the level at which a carton will be rejected may occur at any point between the levels shown in accordance with the setting or sensitivity of the electric eye.

Since the weighed or measured load of material deposited in the carton will never exceed the capacity of the carton, any slight variation above a predetermined level will be acceptable. However, it will be appreciated that the present control unit is also operative to reject those cartons in which the levels exceed a predetermined level in a known manner, that is, when the light reflection passes out of the scanning range of the cathode by reason of the axis of the light beam moving out of intersecting relation to the scanning area.

Figure 1:
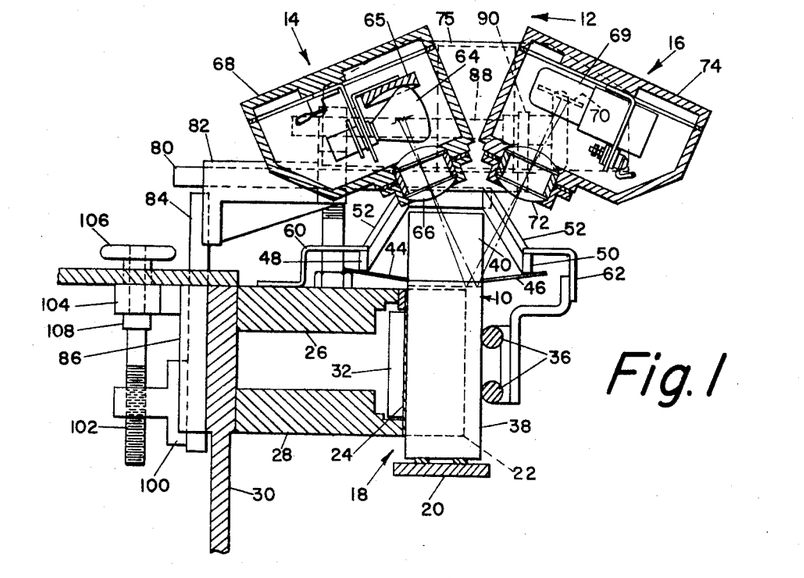
FIG. 1 is an end elevation partly in cross section of an electric eye level control unit embodying the present invention.
Figure 2:
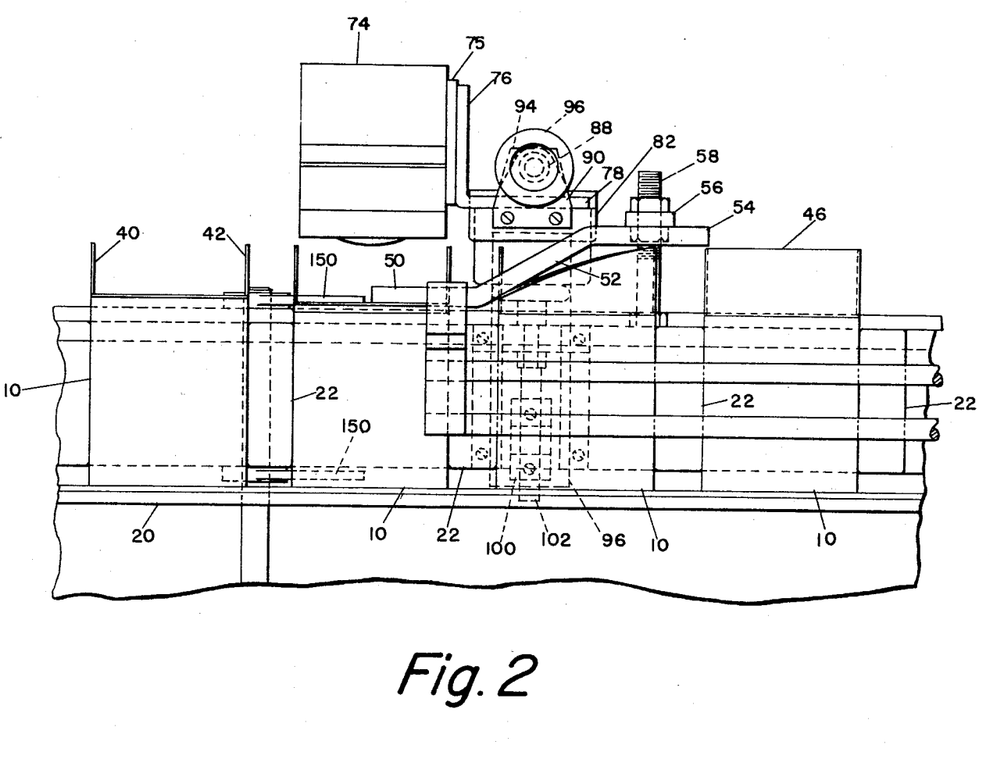
FIGS. 2 and 3 are side elevation and plan views, respectively, of the electric eye level control unit.
Figure 3:
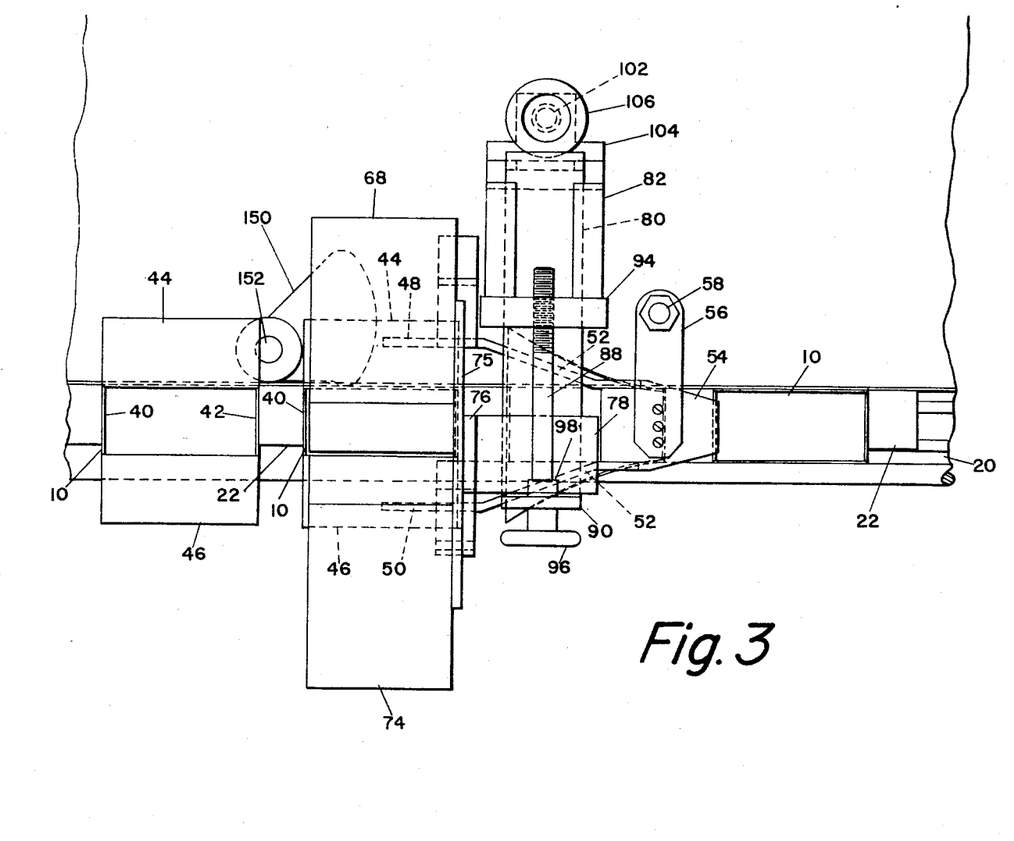
Figure 4:
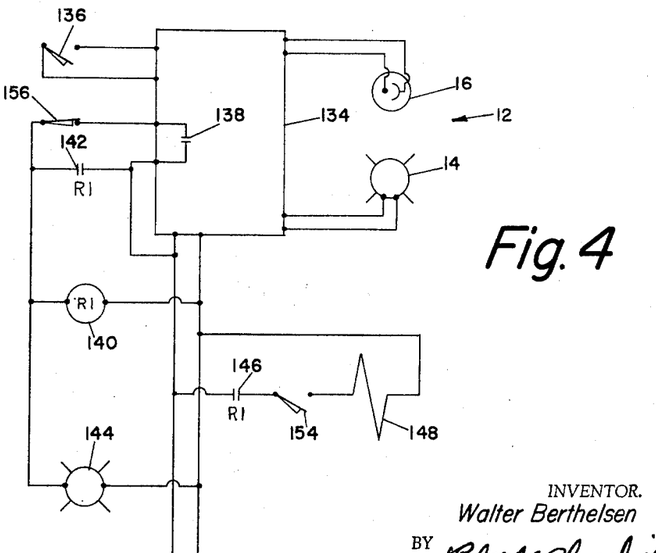

As diagrammatically indicated in FIG. 4, the electric eye level control unit 12 may be included in a circuit for indicating detection of a defectively filled carton and for ejecting the same. The photoelectric eye 16 is connected to an amplifying device indicated at 134 and is arranged to be rendered operative only during a predetermined scanning time each cycle of operation of the filling machine, corresponding to the arrival of successive cartons into operative relation to the control unit, by a cam operated timing switch 136. The circuit is arranged so that when the carton being checked is detected as being at or slightly above a predetermined minimum level the carton is permitted to pass to a delivery point, such as to a top closing machine. However, when a level below such predetermined minimum level is detected, as indicated by a reflection of reduced intensity, relay contacts 138 are closed to complete a circuit to a relay 140 which effects closing of holding contacts 142 and also energizes a circuit to light a lamp 144 or other signal in the circuit to apprise the operator of a defectively filled carton. The relay 140 also effects closing of contacts 146 to energize a reject solenoid 148 in the circuit.

The rejecting mechanism, herein illustrated, may comprise rotary members 150 fast on a vertical shaft 152 and which are arranged to be rotated to engage and push a defectively filled carton laterally off the conveyor or platform 20 into a receptacle, not shown. In practice the shaft 152 may be connected to a one-revolution pawl and ratchet clutch, not shown, which is arranged to be engaged to rotate the rejecting members 150 upon energization of the solenoid 148, as described, to remove a pawl stop. In order to effect operation of the rejecting mechanism in timed relation to the arrival of a defectively filled carton into operative relation thereto, a cam operated rejecting switch 154 is also included in the solenoid circuit. A cam operated resetting switch 156 is also provided in the relay circuit to effect opening of the holding contact 142 each cycle to reset the control unit for a succeeding checking operation.

Figures 17, 18, 19, 20, 21:
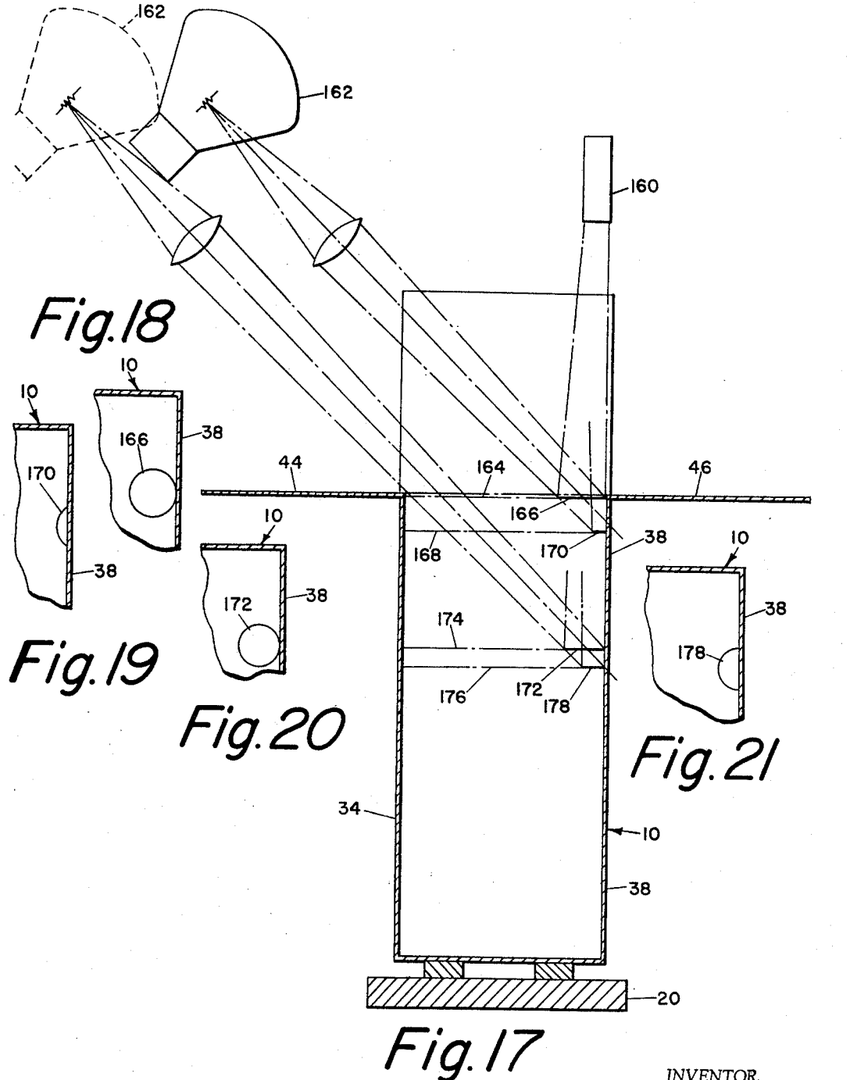
FIG. 17 is a diagrammatic view of a modified form of electric eye level control unit embodying the present invention wherein the electric eye is arranged vertically in a fixed position relative to a side wall of the container, and the light source is arranged to be adjusted laterally to check predetermined minimum levels at different depths in the container.
FIGS. 18 and 19 are partial plan views partly in cross section showing the light reflected from a level at or above a predetermined minimum level near the top of the container, and from a level immediately below such predetermined minimum level, respectively, as shown in FIG. 17.
FIGS. 20, 21 are views similar to FIGS. 18 and 19 showing the light reflected from the different levels at a deeper portion of the carton shown in FIG. 17.

Referring now to FIG. 17, in a modified form of the invention the level control unit comprises an electric eye 160 arranged vertically above the carton and in a fixed position relative to the side wall 38 of the carton, and a light source 162 arranged to direct a beam of light angularly toward the inner face of the side wall 38. In this embodiment of the invention the light source 162 only is arranged to be adjusted laterally with respect to the carton to vary the selected minimum levels to be checked, and the electric eye 160 is arranged in a fixed position with its axis in a plane adjacent the inner edge of the side wall 38 to scan the different levels of the material along such inner edge. It will be noted that two different positions of the light source 162 are illustrated in FIG. 17, and two different levels of the material are indicated for each position of adjustment of the light source.

The adjusted position of the light source 162 illustrated in full lines in FIG. 17 is arranged to check a predetermined minimum level of the material at a point near the top of the carton. At the level 164 illustrated the light reflection 166, also shown in FIG. 18, comes entirely within the edge of the side wall 38 so that the entire reflection 166 is fully visible to the electric eye 160 to indicate that the material is at or above a predetermined minimum level. At the lower level 168 illustrated it will be seen that only a relatively small portion 170 of the reflection, also shown in FIG. 19, is visible to the electric eye, the remainder of the reflection being reflected against the inner surface of the carton side wall 38 and out of view of the electric eye 160. As described in reference to the embodiments shown in FIGS. 5 and 9, the predetermined minimum level selected may occur anywhere between the levels 164, 168 illustrated since the circuit may be set or adjusted to respond to a relatively small difference in light intensity. It will be noted that in the modified embodiment of the invention a relatively small change in the level of the material below a selected minimum level will also result in a relatively great reduction in the size and intensity of the light reflection because of the portion of the light reflected against the inner surface of the side wall 38 as the level is lowered in the carton.

The adjusted position of the light source 162 illustrated in dotted lines in FIG. 17 is arranged to check a predetermined minimum level of material at a substantially lower point in the carton. Here also, the light reflecton 172 at one level 174 adjacent such lower point comes within the edge of the side wall 38 and is fully visible to the electric eye 160 to indicate that the material is at or above a predetermined minimum level, as also indicated in FIG. 20. At a level 176, immediately below the level 174, the light reflection 178, also shown in FIG. 21, is greately reduced by reason of some of the reflection being directed against the inner surface of the side wall 38. The predetermined minimum level at which the control unit will respond may occur at any selected level between the levels indicated. With this construction it will be seen that a different predetermined minimum level selected to be checked may be easily and quickly attained by merely adjusting the light source laterally to direct its beam at a different point against the inner surface of the side wall 38.

It will be understood that the electric eye 160 and the light source 162 may be included in a circuit similar to that shown in FIG. 4 so as to permit those cartons which are filled to a predetermined selected level to pass to a discharge point or to a top closure device, and those cartons which are detected as filled below such predetermined level will be ejected from the machine as described.

While the preferred embodiment of the invention has been herein illustrated and described, it will be understood that the invention may be embodied in other forms within the scope of the following claims.

Having thus described the invention, what is claimed is:

1. In apparatus for checking the level of material in successive containers open at the top, an electric eye level control unit comprising a light source and an electric eye angularly arranged in spaced relation above the containers, said light source directing its beam toward the inner face of a side wall of the open container to reflect light from the surface of the material adjacent said side wall, said electric eye being arranged relative to said side wall so that a light reflection of maximum size and intensity is visible to said electric eye when the level of the material is at a predetermined minimum level, the visible portion of said light reflection being substantially reduced in size and intensity by interference of said side wall when the level of the material is below said predetermined level.

2. The combination as defined in claim 1 wherein a relatively small difference in the level below said predetermined minimum level effects a relatively great reduction in the visible portion of said light reflection.

3. In apparatus for checking the level of material in successive containers open at the top, an electric eye level control unit comprising a light source and an electric eye angularly arranged in spaced relation above the containers, said light source directing its beam toward the inner face of a side wall of the open container to reflect light from the surface of the material adjacent said side wall, said electric eye being arranged relative to said side wall so that a light reflection of maximum size and intensity is visible to said electric eye when the level of the material is at a predetermined minimum level, the visible portion of said light reflection being substantially reduced in size and intensity by interference of said side wall when the level of the material is below said predetermined level, and means for adjusting said control unit laterally relative to said side wall to vary said predetermined minimum level.

4. In apparatus for checking the level of material in successive containers open at the top, an electric eye level control unit comprising a light source and an electric eye angularly arranged in spaced relation above the containers, said light source directing its beam toward the inner face of a side wall of the open container to reflect light from the surface of the material adjacent said side wall, said electric eye being arranged relative to said side wall so that a light reflection of maximum size and intensity is visible to said electric eye when the level of the material is at a predetermined minimum level, the visible portion of said light reflection being substantially reduced in size and intensity by interference of said side wall when the level of the material is below said predetermined level, and means responsive to said control unit for indicating when a carton is filled below said predetermined minimum level.

5. In apparatus for checking the level of material in successive containers open at the top, an electric eye level control unit comprising a light source and an electric eye angularly arranged in spaced relation above the containers, and light source directing its beam toward the inner face of a side wall of the open container to reflect light from the surface of the material adjacent said side wall, said electric eye being arranged relative to said side wall so that a light reflection of maximum size and intensity is visible to said electric eye when the level of the material is at a predetermined minimum level, the visible portion of said light reflection being substantially reduced in size and intensity by interference of said side wall when the level of the material is below said predetermined level, and means responsive to said control unit for rejecting a carton found to be filled below said predetermined minimum level.

6. In apparatus for checking the level of material in successive continuously moving containers open at the top, an electric eye level control unit comprising a light source and an electric eye angularly arranged in spaced relation above said container and disposed in a line transversely of the direction of movement of the containers, said light source directing its beam toward the inner face of a side wall of the open container to reflect light from the surface of the material adjacent said side wall, said electric eye being arranged relative to said side wall so that a light reflection of maximum size and intensity is visible to said electric eye when the level of the material is at a predetermined minimum level, the visible portion of said light reflection being substantially reduced in size and intensity by interference of said side wall when the level of the material is below said predetermined minimum level.

7. In apparatus for checking the level of material in successive continuously moving containers open at the top, an electric eye level control unit comprising a light source and an electric eye angularly arranged in spaced relation above said container and disposed in a line transversely of the direction of movement of the containers, said light source directing its beam toward the inner face of a side wall of the open container to reflect light from the surface of the material adjacent said side wall, said electric eye being arranged relative to said side wall so that a light reflection of maximum size and intensity is visible to said electric eye when the level of the material is at a predetermined minimum level, the visible portion of said light reflection being substantially reduced in size and intensity by interference of said side wall when the level of the material is below said predetermined minimum level, and means for adjusting said control unit laterally relative to said side wall to vary said predetermined minimum level.

8. Apparatus as defined in claim 6 wherein the electric eye is disposed relative to said side wall to have a portion of its scanning range cut off by said side wall whereby the visible portion of the light reflection is reduced in size when the level is below said predetermined minimum level.

9. Apparatus as defined in claim 6 wherein the electric eye is disposed vertically relative to said side wall, and wherein the visible portion of the light reflection is reduced in size by a portion of the reflection directed against said side wall when the level is below said predetermined level.

10. Apparatus as defined in claim 9 wherein the electric eye is disposed in a fixed position relative to said side wall, and wherein provision is made for adjusting said light source laterally relative to said electric eye and said side wall to vary said predetermined minimum level.

11. In apparatus for checking the level of material in successive continuously moving cartons open at the top having upstanding opposed side and end wall top closing flaps, a conveyer for advancing the cartons in a line with the major axis of the top of the carton parallel to the direction of advance of the cartons, an electric eye level control unit comprising a light source, and an electric eye angularly arranged in spaced relation above said cartons and disposed in a line transversely of the conveyer, means for folding opposed side wall flaps downwardly and outwardly to expose the entire top of the carton to the control unit without interference from the side flaps, said light source directing its beam toward the inner face of a side wall of the open container to reflect light from the surface of the material adjacent said side wall, said electric eye being arranged relative to said side wall so that a light reflection of maximum size and intensity is visible to said electric eye when the level of the material is at a predetermined minimum level, the visible portion of said light reflection being substantially reduced in size and intensity by interference of said side wall when the level of the material is below said predetermined minimum level, and means for adjusting said control unit laterally relative to said side wall to vary said predetermined minimum level.

12. Apparatus for photoelectrically checking the filling level of material in a container open at the top comprising means for directing a light beam angularly toward the inner face of a side wall of the open container to reflect light from the surface of the material adjacent said side wall, and a photoelectric eye disposed relative to said side wall so that the light image reflected from a predetermined minimum level will be entirely visible to the photoelectric eye and the light image reflected from a level below said predetermined level being substantially reduced in size by interference of said side wall.

References Cited by the Examiner
UNITED STATES PATENTS

| | | | |
|---|---|---|---|
| 1,706,857 | 3/1929 | Mathe | 250—218 |
| 2,215,211 | 9/1940 | Devol | 250—222 X |
| 2,366,152 | 12/1944 | Lauterbach | 250—222 X |
| 2,524,929 | 10/1950 | Razek | 250—223 X |
| 2,606,297 | 8/1952 | Sweet | 250—218 |

RALPH G. NILSON, *Primary Examiner.*

E. STRICKLAND, J. D. WALL, *Assistant Examiners.*